United States Patent [19]

Setchell, Jr.

[11] Patent Number: 5,208,674
[45] Date of Patent: May 4, 1993

[54] MICRO-DISPERSION ELECTRONIC CAMERA

[75] Inventor: John S. Setchell, Jr., Rochester, N.Y.

[73] Assignee: Eastman Kodak Company, Rochester, N.Y.

[21] Appl. No.: 896,501

[22] Filed: Jun. 19, 1992

Related U.S. Application Data

[63] Continuation of Ser. No. 633,132, Dec. 24, 1990, abandoned.

[51] Int. Cl.5 .............................................. H04N 5/30
[52] U.S. Cl. .................................. 358/209; 358/909; 358/213.11
[58] Field of Search .................. 358/209, 44, 55, 61, 358/331, 163, 42; 350/162.2, 162.21, 162.24; 359/566, 615; 250/226, 208.1, 237 G; 356/302, 305, 326, 328

[56] References Cited

U.S. PATENT DOCUMENTS

| | | | |
|---|---|---|---|
| 2,088,339 | 7/1937 | Preinerstorfer | 88/16.4 |
| 2,312,800 | 3/1943 | Cawein | 178/5.4 |
| 2,809,232 | 10/1957 | Hoyt | 178/5.4 |
| 3,195,397 | 7/1965 | Clapp | 356/302 |
| 3,759,155 | 9/1973 | Bestenreiner et al. | 95/12.2 |
| 3,940,788 | 2/1976 | Abe et al. | 358/55 |
| 4,079,411 | 3/1978 | Engelbrecht et al. | 358/6 |
| 4,178,611 | 12/1979 | Okano | 358/44 |
| 4,255,019 | 3/1981 | Knop | 350/162 |
| 4,626,102 | 12/1986 | Storck et al. | 356/328 |
| 4,790,654 | 12/1988 | Clarke | 356/310 |
| 4,847,489 | 7/1989 | Dietrich | 250/226 |
| 4,857,726 | 8/1989 | Kinney et al. | 250/226 |
| 4,967,264 | 10/1990 | Parulski et al. | 358/44 |

FOREIGN PATENT DOCUMENTS 62-258580 11/1987 Japan.

OTHER PUBLICATIONS

The Reproduction of Colour, R. W. G. Hunt, 3rd Ed., 1975 pp. 6-7.

Primary Examiner—Donald O. Woodiel
Assistant Examiner—Tuan V. Ho
Attorney, Agent, or Firm—Parkhurst, Wendel & Rossi

[57] ABSTRACT

An method and apparatus for providing a spectrally correct image representation is disclosed. Incoming scene light is divided into a plurality of micro-spectra and imaged onto an electronic image sensor unit by a grating and a light dispersing system. Digital image data produced by the electronic image system represents a spectrally correct image.

1 Claim, 4 Drawing Sheets

MICRO-DISPERSION ELECTRONIC CAMERA

This is a continuation of application Ser. No. 633,132, filed Dec. 24, 1990, now abandoned.

TECHNICAL FIELD

The invention relates in general to electronic imaging systems. More specifically, the invention relates to electronic imaging systems that are capable of providing a spectrally correct image representations by generating a plurality of micro-spectra from scene light and using each micro-spectrum to expose a plurality of pixel elements of an electronic image sensor unit.

BACKGROUND ART

Practical color reproduction processes in photography, printing and television have conventionally been limited to three-color chemical or electronic processes. Three-color processes are generally based on compromises between conflicting requirements, but yield acceptable—if not completely accurate—color image representations for many imaging applications. It has long been a goal of imaging research, however, to achieve a practical means for providing a spectrally correct color image representation instead of relying on the compromises and inherent inaccuracies of three-color processes.

Early attempts at providing spectrally correct images included the micro-dispersion method of color photography and the Lippmann method of color photography. The microdispersion method of color photography involved spreading the light from each part of a scene to be imaged into a corresponding spectrum and recording the corresponding spectrums for each part of the scene on photographic film. The Lippmann method of color photography involved the use of an emulsion-mercury interface that acted as a mirror to reflect oncoming image waves. The waves reflected off the emulsion-mercury interface then interfere with one another to produce standing waves in the emulsion. The above-described methods are discussed in greater detail in *The Reproduction of Colour*, by R. W. G. Hunt, 3rd Edition, 1975.

Both the Lippmann method and the micro-dispersion method, while achieving the goal of spectrally correct image reproduction, met with difficulties that limited their implementation in practical commercial systems. Accordingly, a need still exists for a practical system of obtaining a spectrally correct image representation. It is therefore an object of the invention to provide a practical method and apparatus that is capable of producing a spectrally correct image representation.

SUMMARY OF THE INVENTION

The invention provides a method and apparatus for producing a spectrally correct image representation. In particular, an electronic imaging apparatus is provided that includes a grating, a lens for imaging scene light on the grating, a light dispersing system, a field lens for imaging scene light that passes through the grating through a light dispersing system and onto an electronic image sensor unit, a framestore unit coupled to an output of the electronic image sensor unit, and a controller for controlling the operation of the electronic image sensor unit and the framestore unit.

In operation, scene light is divided into a plurality of micro-spectra and imaged onto the electronic image sensor unit by the grating and light dispersing system such that each micro-spectrum covers a plurality of pixel elements of the electronic image sensor. The pixel elements generate signals that correspond to the intensity of portion of the micro-spectra imaged thereon. The pixel element signals, which together comprise a spectrally correct image representation, are converted to digital image data that is stored in the framestore unit.

BRIEF DESCRIPTION OF THE DRAWINGS

With the above as background, reference should now be made to the following detailed description of the preferred embodiment and the accompanying drawings, wherein.

DETAILED DESCRIPTION OF THE PREFERRED EMBODIMENT

Figure 1:
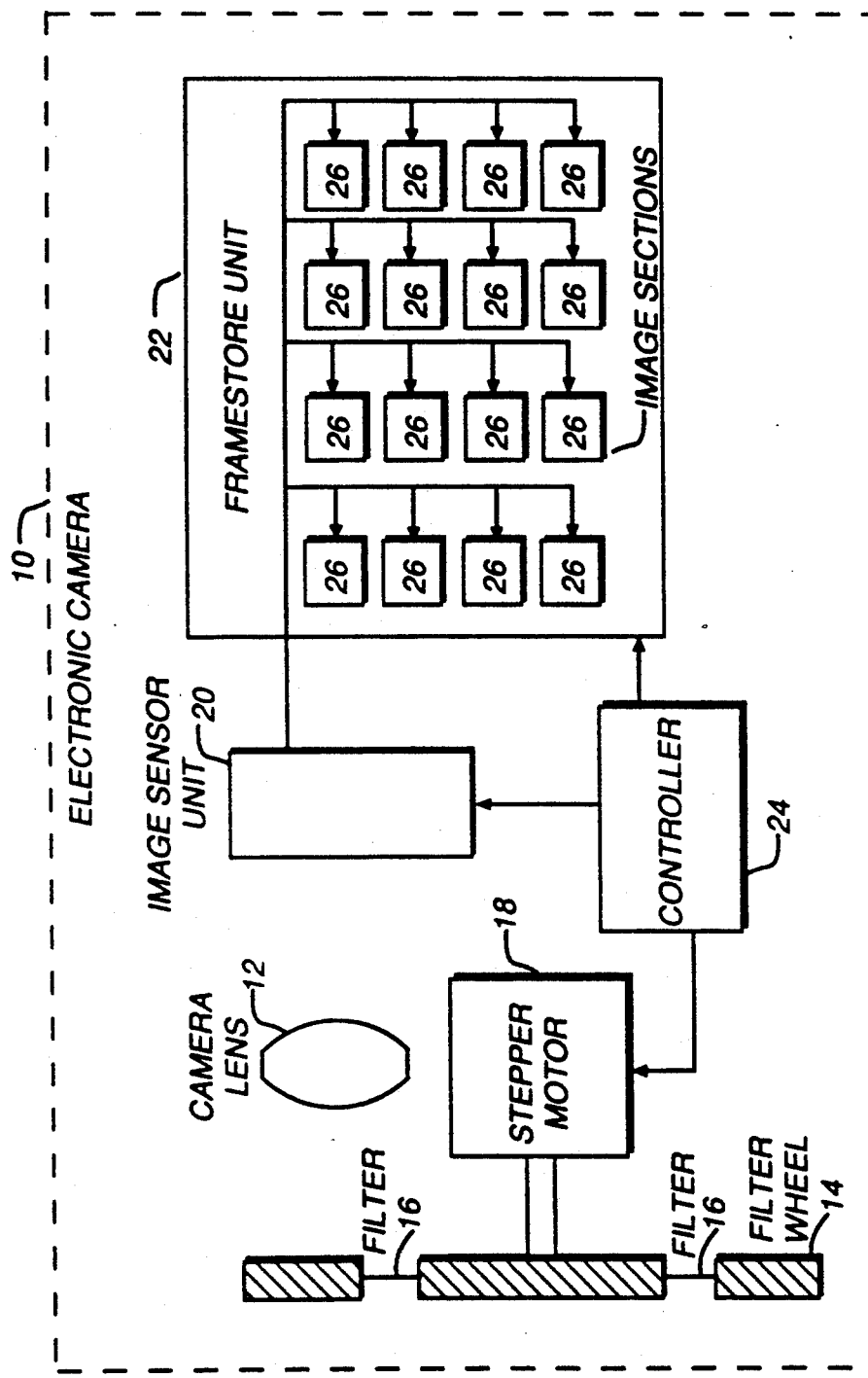
FIG. 1 is a block diagram of an electronic camera that employs a filter wheel to take multiple images of a scene and produce a spectrally correct image representation.

Referring now to FIG. 1, an electronic camera 10 is illustrated that includes a camera lens 12, a narrow-band filter wheel 14 including a plurality of filters 16, a stepper motor 18 coupled to the narrow-band filter wheel 14, an electronic image sensor unit 20, a framestore unit 22 coupled to the output of the electronic image sensor unit 20, and a microprocessor based controller 24 that controls overall camera operations. The filters 16 of the filter wheel 14 preferably have wavelengths that span the visible spectrum from 400 to 700 nm. For example, sixteen filters each having a bandwidth of 20 nm are sufficient for most applications, although other numbers of filters and bandwidth ranges may be readily employed. The electronic image sensor unit 20 includes an electronic imaging device, such as a CCD sensor, that has an array of pixel elements which produce a photocharge in response to incident light, and associated circuitry for transferring and converting the photocharge to a digital output image signal. The operation of electronic image sensors is well known in the art and need not be explained in further detail. The framestore unit 22 is divided into a plurality of N×M image sections 26, where N is the number of filters 16 on the filter wheel 14 and M is the number of pixel elements contained in the electronic image sensor unit 20.

In operation, the controller 24 controls the stepper motor 18 and the image sensor unit 20 to rotate the filter wheel 14 and sequentially capture scene light that is imaged through each of the filters 16 as separate wavelength specific images. The electronic image sensor unit 20 produces digital image data that corresponds to each of the wavelength specific images, and supplies the digital image data to the framestore unit 22 for storage in corresponding image sections 26. The digital image data that is stored in the framestore unit 22 represents a plurality of wavelength specific images of the original scene, and can be combined to produce a combined spectrally correct image of the original scene being imaged.

The electronic camera 10 is calibrated by capturing an image of a flat white surface illuminated by the same lighting as the scene. The ratio of the scene image to the white surface image represents the reflectance of the scene. Calibration by this method also compensates for irregularities in the response of the pixel elements of the electronic image sensor unit 20.

The electronic camera illustrated in FIG. 1, while providing a spectrally correct image representation via the image data stored in the framestore unit 22, has a number of deficiencies that prevent practical implementation. For example, the use of the narrow-band filters 16 results in a substantial loss of scene light. In addition, the multiple exposures of the scene through each of the filters 16 requires that the scene contain no significant motion during the exposure process. Accordingly, the electronic camera 10 of FIG. 1 is not practical for most imaging applications.

Figure 2:
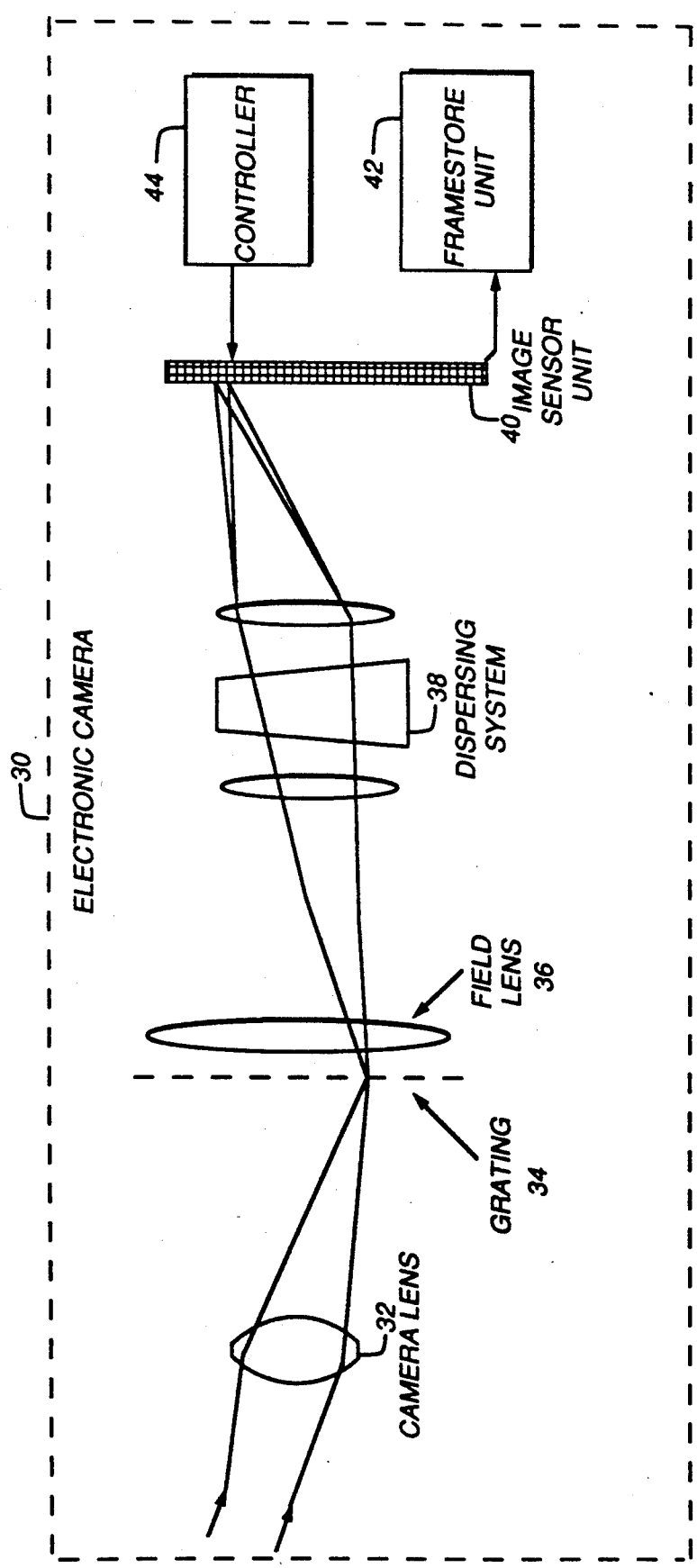
FIG. 2 is a block diagram of a preferred electronic camera that overcomes some of the deficiencies of the electronic camera illustrated in FIG. 1 by utilizing a micro-dispersion technique to produce a spectrally correct image representation.
Figure 4:
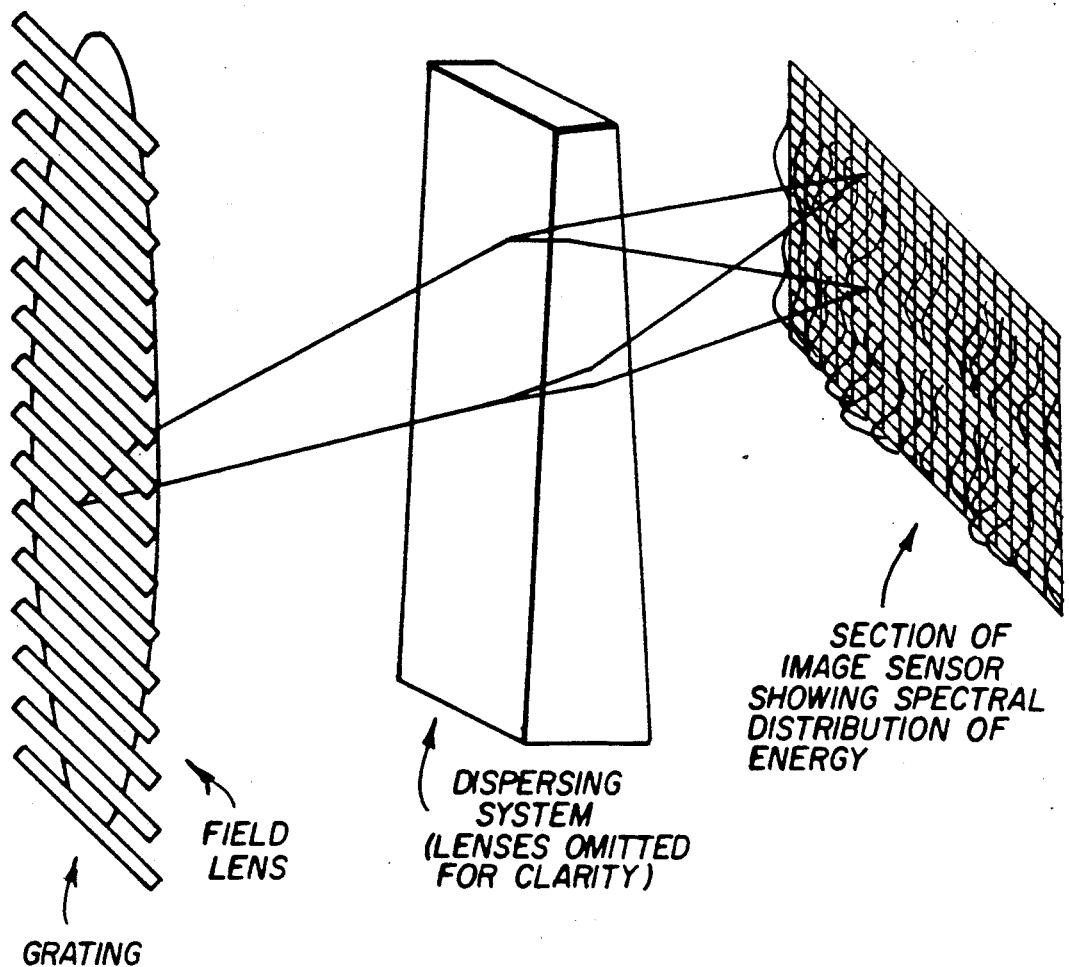
FIG. 4 illustrates how micro-spectra produced in the electronic camera illustrated in FIG. 2 are spread across a plurality of pixel elements of an electronic image sensor unit.

The disadvantages of the electronic camera 10 illustrated in FIG. 1 are overcome by the electronic camera 30 illustrated in FIG. 2, which is based—in part—on the micro-dispersion method of photography mentioned above. The electronic camera 30 includes a camera lens 32 that images scene light onto a grating 34. Scene light passing through the grating 34 is imaged by a field lens 36 through a prism dispersion system 38 in the form of micro-spectra onto an electronic image sensor unit 40. The micro-spectra are imaged onto the electronic image sensor unit 40 such that a plurality of pixel elements are exposed to a single microspectra as graphically illustrated in FIG. 4. The grating pitch, lens focal lengths, and pixel element pitch of the electronic image sensor unit 40 are chosen to spread the micro-spectra produced over a desired number of pixel elements. For example, given an electronic image sensor unit 40 having a pixel element pitch $p=100$ pixels per mm, and a prism dispersion system 38 having a dispersion $d=0.165$ degrees for the extremes of the visible spectrum (400 and 700 nm); to spread the micro-spectra over $s=16$ pixels, the dispersion system would be located at a distance $r=s/(p \sin d)=55$ mm from the sensor. If the field lens 36 is chosen to have a focal length $f=110$ mm, then the grating pitch pg should be $pg=(p/s)(f-r)/r=6.25$ line pairs per mm to minimize overlap of the micro-spectra. The electronic image sensor unit 40 converts the received micro-spectra to digital data which is then stored in a framestore unit 42 under the control of a controller 44.

It is of course necessary to correlate the digital image data received from each pixel element of the electronic image sensor unit 40 to the wavelength of light being imaged by the pixel element in order to be able to utilize the digital image data stored in the framestore unit 42 for practical applications. The correlation could be accomplished through the use of mechanical alignment techniques that would insure specific pixel elements receive a specific wavelength of light from the micro-spectra. It will be readily appreciated that such mechanical alignment would be complicated, time consuming and impractical for mass produced devices. Accordingly, an automatic correlation routine is used to identify the wavelength received by each pixel element.

Figure 3:
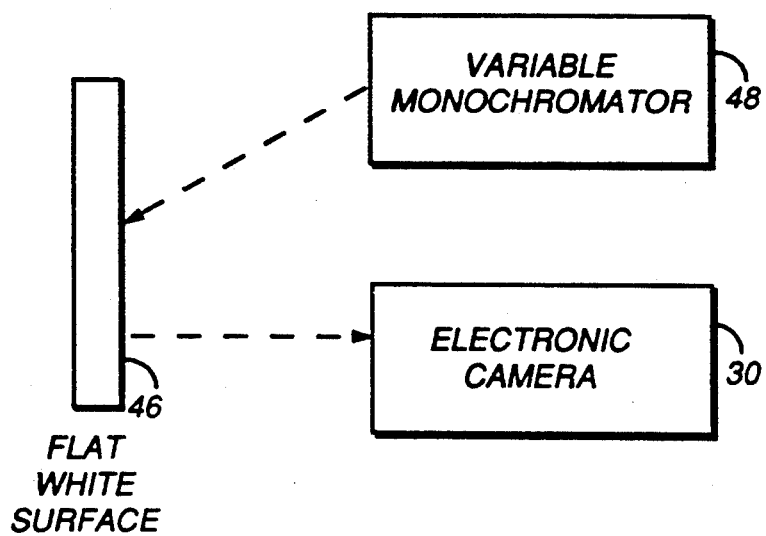
FIG. 3 is a block diagram of a system for correlating pixel image data to specified wavelengths for the electronic camera illustrated in FIG. 2.

The autocorrelation routine will be described with reference to FIG. 3. A flat white surface 46 is sequentially illuminated by light of specific wavelengths of a desired spectrum using a variable monochromator 48. The electronic image sensor unit 40 of the electronic camera 30 is activated to capture an image of the illuminated white surface for each change of wavelength and store digital image data corresponding thereto in the framestore unit 42. The controller 44 polls the image data stored in the framestore unit 42 to determine which of the pixel elements of the electronic image sensor unit 40 produced a signal response for the given wavelength of illumination. The controller 44 creates and stores a data table that identifies the wavelength range accepted by each pixel element. The contents of the data table can be used to match the digital image data that is stored in the framestore unit 42 during a normal exposure operation to specific wavelengths.

Both of the illustrated electronic cameras represented captured images as arrays having spatial and wavelength dimensions. Such images may be integrated pixel by pixel and wavelength by wavelength with any combination of illuminant and color matching functions to produce a device-independent representation in any convenient color coordinate system such as CIELAB.

The invention has been described with particular reference to certain preferred embodiments thereof. It will be understood, however, that modifications and variations are possible within the spirit and scope of the appended claims. For example, the particular elements that are used to generate and image the micro-spectra on the electronic imaging sensor unit may be varied, as long as each of the resulting micro-spectra exposes a plurality of the pixel elements of the electronic imaging sensor unit.

What is claimed is:

1. A method of producing spectrally correct image data comprising the steps of: generating a plurality of micro-spectra from scene light; imaging the microspectra onto an electronic imaging sensor unit including an array of pixel groups, each pixel group including a plurality of pixel elements, wherein each micro-spectra exposes a corresponding pixel group and each pixel element within the corresponding pixel group generates an image signal representative of a portion of the microspectra; generating image data based on signals produced by the pixel elements in response to the imaging of the micro-spectra thereon; and correlating the image data to a plurality of wavelengths;

wherein the step of correlating the image data includes the steps of sequentially illuminating a surface with light of specific wavelengths of a desired spectrum using a variable monochromator, activating the electronic image sensor to capture image correlation data of the surface for each wavelength of light; storing the image correlation data in a framestore; polling the image correlation data stored in the framestore to determine which of the pixel elements of the electronic image sensor produce a signal response for a given wavelength of light; storing a data table which identifies the wavelength of light to which each pixel is responsive; and using the data table to match the image data to a specific wavelength of light.

* * * * *